United States Patent
Tan

(10) Patent No.: US 12,493,446 B2
(45) Date of Patent: Dec. 9, 2025

(54) MEDICAL OPERATION RECORDING METHOD, MEDICAL DEVICE, AND STORAGE MEDIUM

(71) Applicant: SHENZHEN MINDRAY BIO-MEDICAL ELECTRONICS CO., LTD., Shenzhen (CN)

(72) Inventor: Lin Tan, Shenzhen (CN)

(73) Assignee: SHENZHEN MINDRAY BIO-MEDICAL ELECTRONICS CO., LTD., Guandong (CN)

( * ) Notice: Subject to any disclaimer, the term of this patent is extended or adjusted under 35 U.S.C. 154(b) by 678 days.

(21) Appl. No.: 17/539,086

(22) Filed: Nov. 30, 2021

(65) Prior Publication Data
US 2022/0084667 A1 Mar. 17, 2022

Related U.S. Application Data

(63) Continuation of application No. PCT/CN2019/089273, filed on May 30, 2019.

(51) Int. Cl.
G06F 3/16 (2006.01)
G06F 3/01 (2006.01)
(Continued)

(52) U.S. Cl.
CPC .............. G06F 3/167 (2013.01); G06F 3/017 (2013.01); G10L 15/22 (2013.01); G16H 10/60 (2018.01);
(Continued)

(58) Field of Classification Search
CPC ........ G16H 10/60; G16H 40/20; G16H 40/60; G10L 15/22; G06F 2203/0381; G05B 2219/32014; G05B 2219/35444
See application file for complete search history.

(56) References Cited

U.S. PATENT DOCUMENTS

| 7,574,369 B1 | 8/2009 | Borza |
| 2012/0323597 A1 | 12/2012 | Woolford |

(Continued)

FOREIGN PATENT DOCUMENTS

| CN | 103605892 A | 2/2014 |
| CN | 105989558 A | 10/2016 |

(Continued)

OTHER PUBLICATIONS

International Search Report issued in priority International Application No. PCT/CN2019/089273, mailed Feb. 27, 2020, 4 pages.

(Continued)

*Primary Examiner* — Howard Cortes

(74) *Attorney, Agent, or Firm* — PV IP PC; Wei Te Chung

(57) ABSTRACT

A medical operation recording method performed by a medical device and a medical device are disclosed. In the method, operation information of a medical operation that includes operation content and operation occurrence time, can be obtained based on a voice signal or gesture inputted by a user. Then operation information of this medical operation can be recorded. Compared with a method for manually recording the medical operation and then scanning same into related medical device, such method can accurately and timely recording the operation information even when a recorder is far away from the medical device, thus improving the user experience.

20 Claims, 7 Drawing Sheets

(51) Int. Cl.
  *G10L 15/22* (2006.01)
  *G16H 10/60* (2018.01)
  *G16H 40/20* (2018.01)
  *G16H 40/60* (2018.01)

(52) U.S. Cl.
  CPC ............ *G16H 40/20* (2018.01); *G16H 40/60* (2018.01); *G05B 2219/32014* (2013.01); *G05B 2219/35444* (2013.01); *G06F 2203/0381* (2013.01)

(56) References Cited

U.S. PATENT DOCUMENTS

| | | | | |
|---|---|---|---|---|
| 2015/0164436 | A1* | 6/2015 | Maron | A61B 90/90 340/540 |
| 2018/0036469 | A1* | 2/2018 | Crnkovich | H04B 1/3833 |
| 2020/0371744 | A1* | 11/2020 | Liao | G16H 30/20 |
| 2021/0382559 | A1* | 12/2021 | Segev | G06F 3/013 |

FOREIGN PATENT DOCUMENTS

| | | |
|---|---|---|
| CN | 106326640 A | 1/2017 |
| CN | 106372421 A | 2/2017 |
| CN | 107093426 A | 8/2017 |
| CN | 107422955 A | 12/2017 |
| CN | 107863133 A | 3/2018 |
| CN | 207367596 U | 5/2018 |
| CN | 108962341 A | 12/2018 |
| CN | 109300517 A | 2/2019 |
| JP | 2001175795 A | 6/2001 |

OTHER PUBLICATIONS

Extended European Search Report issued in related European Application No. 19930228.2, mailed May 12, 2022, 8 pages.
First Office Action issued in related Chinese Application No. 201980093705.3, mailed May 16, 2023, 10 pages.
Second Office Action issued in related Chinese Application No. 201980093705.3, mailed Dec. 29, 2023, 10 pages.
Office Action issued in related European Application No. 19930228.2, mailed Mar. 7, 2025, 8 pages.

* cited by examiner

Cardiopulmonary Resuscitation Procedure

① Compression ▷    ④ Defibrillation ▷

② Blow ▷           ⑤ Intubation ▷

③ Adrenaline ▷     ⑥ Amiodarone ▷

FIG. 2A

Cardiopulmonary Resuscitation Procedure

① Compression ▷        Defibrillation        ion ▷

② Artificial respiration ▷   360 joules      ine ▷

300 joules

③ Defibrillation ▷       200 joules          rone ▷

④ Intubation ▷           150 joules          ▷

FIG. 2B

Recording Sheet

10:27:13 Rescue End (succeed)
10:25:00 Adrenaline 2mg
10:14:15 Compression Start
10:12:00 Defibrillation, 360 joules
10:07:30 Blow Twice
10:05:50 Adrenaline 1mg
10:05:00 Compression Pause
10:02:34 Compression Start
10:01:05 Defibrillation, 200 joules
10:00:00 Rescue Start

FIG. 2C

MEDICAL OPERATION RECORDING METHOD, MEDICAL DEVICE, AND STORAGE MEDIUM

CROSS REFERENCE TO RELATED APPLICATIONS

This disclosure is a bypass continuation of Patent Cooperation Treaty Application No. PCT/CN2019/089273, filed on May 30, 2019, the content of which is hereby incorporated by reference in its entirety.

TECHNICAL FIELD

The disclosure relates to the technical field of medical devices, and more particularly to a medical operation recording method, medical device and storage medium.

BACKGROUND

In the medical field, under certain circumstances, medical staff needs to implement a medical procedure including multiple items of operation for patients. Generally, operation information of the medical procedure needs to be recorded and saved in a medical device which enables medical staff to review and analyze. However, during the implementation of some medical procedures, it may be inconvenient for medical staff to record operation information directly into the medical device.

For example, a cardiopulmonary resuscitation rescue procedure of a patient in or out of hospital is often completed with the cooperation of three medical workers or trained personnel. Two of them are responsible for the operation, such as cardiopulmonary resuscitation and drug administration and so on, in turns, while the other one is responsible for recording the whole rescue procedure. The most commonly used medical devices during the rescue process include monitors, defibrillators, etc. However, these medical devices often need to be close to the patient. Meanwhile, more space around the patient needs to be given to the personnel carrying out the rescue treatment. Therefore, in order to give way to the rescue personnel, the personnel responsible for recording may be far away from the medical device, so it is inconvenient for he/she to operate the medical device for recording.

At present, the operation information is usually written on paper manually at first and then recorded in the medical device by scanning the paper or typing the written operation information. This recording method is not accurate or timely.

SUMMARY

In this regard, a medical operation recording method for improving timeliness and accuracy of operation information recording in a medical procedure is provided in this disclosure. In additional, a medical device and storage medium are further provided to ensure the application and implementation of the method in practice.

In order to achieve the above purpose, following technical solutions are provided in the present disclosure.

In a first aspect, a medical operation recording method applicable to a medical device, is provided, which including:
obtaining a voice signal inputted by a user;
obtaining operation information of medical operation based on the voice signal; wherein, the medical operation is operation included in a target medical procedure, and the operation information includes at least two information items of medical operation content and medical operation occurrence time;
recording the operation information of the medical operation.

In a second aspect, a medical operation recording method applicable to a medical device, is provided, which including:
obtaining a gesture inputted by a user;
obtaining operation information of medical operation based on the gesture; wherein, the medical operation is operation included in a target medical procedure, and the operation information includes at least two information items of medical operation content and medical operation occurrence time;
recording the operation information of the medical operation.

In a third aspect, a medical device is provided, which including:
a display configured to display information;
a memory configured to store executable program instructions;
a processor configured to execute the executable program instructions to implement steps of the medical operation recording method.

In a fourth aspect, a readable storage medium on which a computer program is stored, wherein when the computer program is executed by a processor, steps of the medical operation recording method are implemented.

A medical operation recording method is provided by this disclosure. When such method is applied to a medical device, this medical device can acquire a voice signal inputted by the user, obtain operation information of medical operation based on the voice signal, and store the operation information, wherein the operation information includes operation content and operation occurrence time. It can be seen that, the user can trigger the medical device to automatically record the operation information of the medical operation through the voice signal. Compared with the preset recording manner into the medical device through manual handwriting and scanning, this method can not only record timely and accurately, but also effectively reduce the trouble caused by the long distance between the recorder and the medical device. Even if the recorder is far away from the medical device, he/she still can quickly record the operation information of the medical operation in the medical device, which brings good user experience.

BRIEF DESCRIPTION OF THE DRAWINGS

In order to explain embodiments of this disclosure or technical solutions in the prior art more clearly, the following will briefly introduce drawings required in the description for the embodiments or the prior art description. It is obvious that the drawings in the following description are only some embodiments of this disclosure. For those skilled in the art, other drawings can be obtained from these accompanying drawings without paying any creative works.

FIGS. 2A-2B are schematic diagrams showing operation recording guidance zones.

FIG. 2C is a schematic diagram showing an operation information display zone.

DETAILED DESCRIPTION

The technical solutions in example embodiments of the disclosure will be described clearly and completely below with reference to the accompanying drawings. Apparently, the embodiments described are merely some, rather than all, of the embodiments of the disclosure. It should be understood that the disclosure is not limited by the example embodiments described herein. All other embodiments derived by those skilled in the art without creative efforts on the basis of the embodiments described in the disclosure shall fall within the scope of protection of the disclosure.

Medical staff may need to implement a medical procedure for patients, such as a cardiopulmonary resuscitation procedure, a sepsis treatment procedure, etc. The medical procedure includes a series of operation actions and operation information of the operation actions needs to be recorded in a medical device for subsequent viewing. At present, most of the recording methods are implemented by writing the operation on paper manually and then scanning the paper for recording. Accordingly, there methods are not timely and prone to errors.

This disclosure provides a medical operation recording method applicable to a medical device, which enables the medical device to record the medical operation automatically based on a user's instruction. In order to facilitate recording, the medical device is usually a device associated with the implementation of the medical procedure, or a device placed at an implementation site of the medical procedure. For example, during the cardiopulmonary resuscitation rescue process, medical devices most likely to present, are monitors, defibrillators, and so on, so these devices can be used as the medical device for recording.

Figure 1:
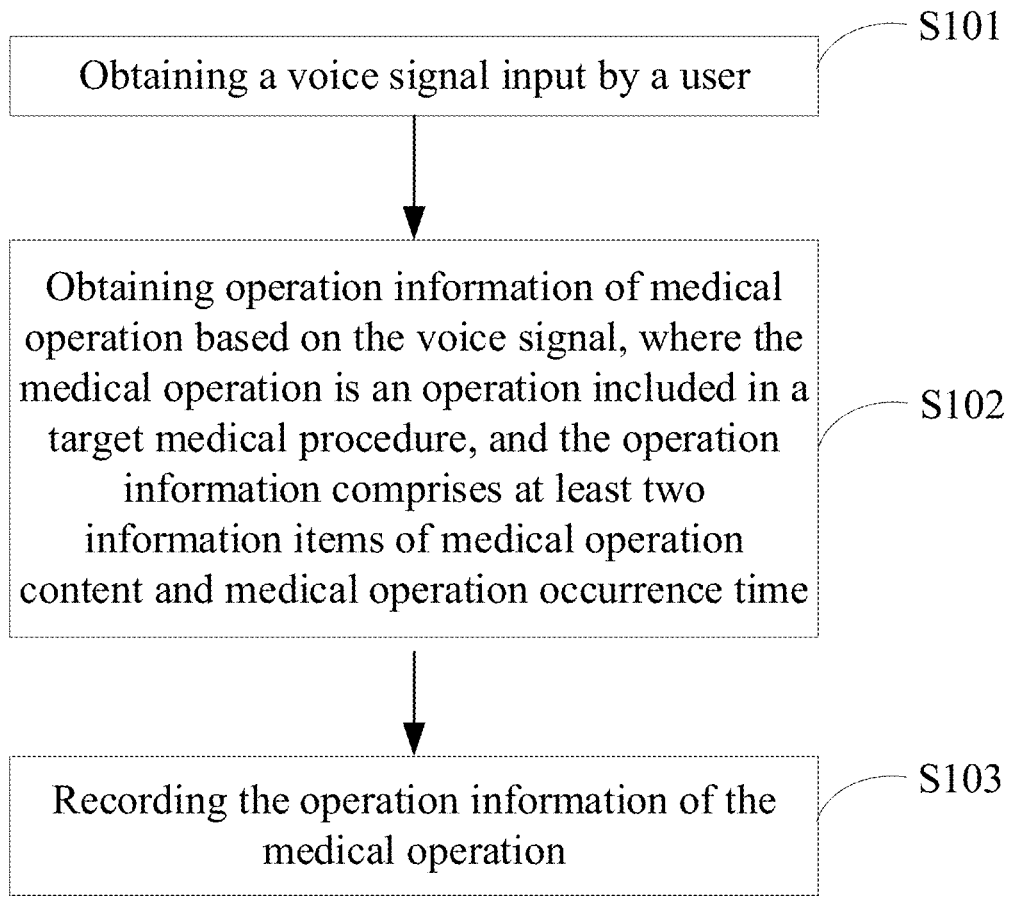
FIG. 1 is a flowchart of a medical operation recording method.

FIG. 1 has shown a process of a medical operation recording method. As shown in FIG. 1, the process can specifically include steps S101-S103.

In step S101, a voice signal inputted by a user is obtained.

In practical applications, medical devices are usually placed at the operation site of the medical procedure, and such operation site is often inconvenient for the user to access the medical devices nearby. For example, in the cardiopulmonary resuscitation rescue process, medical devices, such as monitors and defibrillators, often need to be close to the patient, and more space around the patient needs to be given to the personnel carrying out the rescue treatment. Therefore, the personnel responsible for recording may be far away from the medical device, so it is inconvenient for he/she to operate the medical device for recording.

Therefore, the medical device can be arranged with an audio acquisition module. When the user needs to record the operation information of the medical operation, a voice signal recording the operation information content can be inputted to the medical device, and the audio acquisition module can be used to acquire the voice signal inputted by the user.

It should be noted that the time point for the user to input the voice signal may be at random. In order to realize a real-time recording, the audio acquisition module can automatically keep in the working state to continuously detect whether the voice signal is received. Of course, based on the consideration of saving electric energy and computing resources of the medical device, the audio acquisition module can be switched off by the user's triggering. Or the medical device can automatically switch off the audio acquisition module when the detection action of the audio acquisition module satisfies a preset switching-off condition. The preset switching-off condition can include but are not limited to that no voice signal is detected for a certain time period.

Under the situation that the audio acquisition module has been switched off, the audio acquisition module can be restarted if the medical device detects a recording start instruction of medical operation. The input manners of the recording start instruction can include but are not limited to the followings.

For example, a physical start button of the audio acquisition module can be arranged on the medical device, and the user can input the recording start instruction by touching the button. For another example, the medical device can integrate the start button of the audio acquisition module in the display interface, such as a function setting interface and so on, and the user can input the recording start instruction by triggering the start button. For a further example, a photosensitive module can be arranged on the medical device, and the user inputs the recording start instruction that satisfies the preset requirement through the photosensitive module. Specifically, for example, if the user blocks the photosensitive module for a preset time to make the photosensitive module detect a light change that satisfies a preset requirement, it is determined that the recording start instruction is detected. For another example, an image acquisition module can be arranged on the medical device, and when the user inputs a gesture (such as drawing triangles, circles, etc.) that satisfies a preset requirement to the image acquisition module, it is determined that the user has inputted the recording start instruction. Of course, the above ways of starting the audio acquisition module are only examples, and other ways that can be thought of by those skilled in the art are within the protection scope of this disclosure.

It should be noted that the starting of the audio acquisition module can be regarded as the starting or activation of the recording function.

In step S102, operation information of medical operation is obtained based on the voice signal. Wherein, the medical operation is operation included in a target medical procedure, and the operation information includes at least two information items, that is, medical operation content and medical operation occurrence time.

After being acquired by the audio acquisition module, the voice signal can be analyzed by the medical device. Such analyzing can transfer the human language into information that can be recognized by the computer. In the voice signal analysis process, semantic content contained in the voice signal can be extracted, so that the operation information of the medical operation can be obtained based on the semantic content.

It should be noted that a main application scenario of this disclosure is to record the operation contained in a medical procedure. The medical procedure refers to a procedure including a series of operation actions. For example, the cardiopulmonary resuscitation procedure generally includes operation actions such as defibrillation, heart compression, injecting adrenaline, blowing air into lungs and so on. The sepsis treatment procedure generally includes three stages, such as sepsis screening stage, emergency treatment stage and follow-up treatment stage. In the sepsis screening stage, the vital sign parameters of patients can be scored. In the emergency treatment stage, patients having sepsis symptoms can be subjected to a series of emergency treatment operation actions, such as lactic acid examination, blood culture, antibiotics administration, vasoactive drug administration and so on. The follow-up treatment stage can include a series of treatment operation.

In practical application, the medical procedure needs to be recorded at present is called as the target medical procedure. That is, the target medical procedure refers to the medical procedure to which the medical operation to be recorded belong. For example, if the cardiopulmonary resuscitation procedure needs to be recorded at present, the target medical procedure is the cardiopulmonary resuscitation procedure.

One way to determine the target medical procedure is as follows. The medical device can provide users with a variety of alternative medical procedures before recording the medical operation. Users can select a certain medical procedure by entering an instruction, then the selected medical procedure is determined as the target medical procedure. The instruction can be inputted through physical keys, touch screens, voices, gestures and other methods.

In order to record the operation information of the medical operation in the target medical procedure, the voice signal inputted by the user to the medical device is the voice signal associated with the target medical procedure, such that the operation information obtained based on the voice signal is the operation information of the medical operation in the target medical procedure.

The voice signal may directly or indirectly indicate the operation information of the medical operation. Based on the indication of the voice signal, the operation information of the medical operation can be obtained. The operation information includes at least two information items, namely, the medical operation content and the medical operation occurrence time. It should be noted that the voice signal can include instructions for starting or ending the operation. The operation information about "starting operation" and "ending operation" determined based on the voice signal can also be regarded as the medical operation content and recorded and saved together with other medical operation content.

Among them, the acquisition methods of the medical operation content and the medical operation occurrence time are not limited to that both are obtained from the voice content of the voice signal. One information item can be extracted from the voice signal, and the other information item can be obtained by other methods based on the triggering of the voice signal.

How to determine the medical operation occurrence time according to the voice signal is described in detail as follows.

In order to facilitate recording, the medical operation occurrence time is usually not included in the voice signal inputted by the user.

One way to determine the occurrence time is that the medical device determines the receiving time of the voice signal as the occurrence time of the medical operation corresponding to the voice signal, after receiving the voice signal. For example, the medical device receives a voice signal at 11:02:00 on May 21, 2019, and the medical operation content extracted from the voice signal is "defibrillation 200 joules", then the occurrence time of the medical operation of "defibrillation 200 joules" is recorded as 11:02:00 on May 21, 2019.

Another way to determine the occurrence time is that if the medical operation is executed by a device other than the recording device, the occurrence time of the medical operation can be obtained from the execution device after determining the medical operation content. Specifically, the medical operation may be performed by an execution device which can record time information such as the start time and/or end time of the medical operation, while the medical device can read the preset type of time information from the execution device and take it as the occurrence time of the medical operation.

Another way to determine the occurrence time is that when the voice signal includes time information, the medical device determines the time information in the voice signal as the occurrence time of the medical operation corresponding to the voice signal.

How to determine the medical operation content according to the voice signal is described in detail as follows.

In one application scenario, all content of the voice signal inputted by the user is the medical operation content, therefore, the content of the voice signal can be directly determined as the medical operation content. For example, if the voice signal inputted by the user is "defibrillation", the "defibrillation" is directly determined as the medical operation content. For another example, if the voice signal inputted by the user is "adrenaline 1 mg", then "adrenaline 1 mg" is directly determined as the medical operation content.

In another application scenario, the format of the voice signal can be predefined. The format includes preset mark information, which represents the start position and/or end position of the medical operation content in the voice signal. Therefore, the preset mark information in the received voice signal can be determined and then the voice content associated with the preset mark information can be determined as the medical operation content.

The association between the medical operation content and the preset mark information can be reflected in the positional relationship, that is, the preset mark information is arranged before or after the medical operation content.

If the preset mark information is before the medical operation content, the voice content after the preset mark information is determined as the medical operation content. For example, if the predefined voice signal format is "record *****", in which "record" is the preset mark information, and the asterisk represents the medical operation content. According to the predefined voice signal format, after the word "record" is detected in the voice signal, the voice content after it can be determined as the medical operation content. For example, if a voice signal inputted by the user is "record adrenaline 1 mg", the voice content "adrenaline 1 mg" after "record" can be determined as the medical operation content.

If the preset mark information is after the medical operation content, the voice content before the preset mark information is determined as the medical operation content.

In another application scenario, the voice signal inputted by the user may contain the information of non-medical operation. In order to ensure the accuracy of the extracted medical operation content, a keyword database including at least one medical operation keyword, can be loaded for the medical procedure in advance. For example, in a keyword database of the cardiopulmonary resuscitation procedure, keywords can include "intubation, start compression, pause compression, end compression, defibrillation, adrenaline, blow", etc. Thus, after receiving the voice signal, the content corresponding to the medical operation keyword can be extracted from the voice signal as the medical operation content.

Among them, the expression that "medical operation keywords correspond to the medical operation content", means they have semantic similarity. Therefore, after acquiring the voice signal, content with semantics same or similar to the preset medical operation content is retrieved from the voice signal. Wherein, the determination condition of similarity is that the semantic similarity between the retrieved content and the preset content satisfies the preset similarity. If the same or similar content is retrieved, the retrieved content is extracted as the medical operation content, or the medical operation keyword is used as the medical operation content inputted by the user. For example, if the voice signal inputted by the user is "start cardiac compression", then the medical device determines that its content satisfies the preset similarity with the "start compression" in the keyword database, the voice signal content is determined as "start compression".

If no content satisfies the preset similarity with the keywords in the keyword database, is retrieved from the voice signal, it indicates that the voice signal inputted by the user does not accord with the preset requirement, and then an instruction information can be output to instruct the user to input the voice signal again. The instruction information can be voice, text, warning tone and other forms.

In the above application scenarios, the voice signal may include information that does not need to be recorded. The above determination method of medical operation can ensure that only the medical operation content is extracted for recording, such that the recording accuracy of the medical operation content can be guaranteed.

It should be noted that the medical devices in the above application scenarios can only target a specific medical procedure, so only the keyword database of the specific medical procedure is loaded. However, some medical devices can be applied to a variety of different medical procedures, and the keyword databases of a variety of medical procedures is can be preset.

Therefore, before extracting the content according to the medical keywords in the keyword database, the target medical procedure can be determined based on an input instruction of the user and then the keyword database corresponding to the target medical procedure can be obtained from the variety of keyword databases. The manners for the user to indicate the target medical procedure can refer to the above description and not repeated here for concise objects.

In another application scenario, in order to guide the user to input voice signals, an operation recording guidance zone can be displayed in the interface. The display time of the interface can be triggered by the user. For example, the medical device will automatically display the interface including the operation recording guidance zone after the target medical procedure is selected by the user. Another example is that the user can start the recording function of the medical device through an instruction and the medical device will automatically display the interface including the operation recording guidance zone after the recording function is started.

The operation recording guidance zone includes options corresponding to medical operation associated with the target medical procedure. If the user wants to input content of a certain medical operation, the option corresponding to the medical operation is inputted into the medical device through the voice signal.

One form of operation recording guidance zone is shown in FIG. 2A. Assuming that the target medical procedure wanted to be recorded by the user is cardiopulmonary resuscitation procedure, the operation recording guidance zone includes six options, in which different options correspond to different medical operation included in the cardiopulmonary resuscitation procedure. Specifically, option 1 is "compression", option 2 is "blow", option 3 is "adrenaline", option 4 is "defibrillation", option 5 is "intubation", and option 6 is "amiodarone". The user can select a certain option as the target option and include the serial number of the target option in the voice signal. For example, the voice signal inputted by the user can be "2" or "operation 2" or "option 2" or the likes. It should be noted that in addition to the medical operation content, the options can also include two options of "procedure start" and "procedure end".

After obtaining the voice signal, the medical device extracts the target option selected by the user from the voice signal, and determines the medical operation corresponding to the target option as the medical operation content.

It should be noted that some types of medical operation may be composed of multiple options. For example, if the type of medical operation is drug administration, it is necessary to record not only the drug name, but also the dosage. For another example, if the type of medical operation is defibrillation, it is necessary to record not only the defibrillation operation, but also the defibrillation power. Therefore, in the operation recording guidance zone, this type of option may have associated options, and the user can further select the medical operation content in the associated options.

Therefore, after extracting the first target option inputted by the user from the voice signal, the option associated with the first target option is displayed. For example, supposing that the first target option extracted from the voice signal is "defibrillation", this option is associated with multiple sub-options of defibrillation power. As shown in FIG. 2B, the multiple sub-options displayed in the interface, comprise "360 joules", "300 joules", "200 joules" and "150 joules" respectively.

The user can use the voice signal to further select an option in the associated options. In order to distinguish from the first target option, the option selected by the user in the associated options is called as the second target option. After obtaining the voice signal including the second target option, the respective medical operation corresponding to the first target option and the second target option can be combined and determined as the medical operation content by the medical device. For example, in the sub-options of the "defibrillation power" shown in FIG. 2B, if the user inputs "300 joules" by a voice signal, the medical device combines the first target option "defibrillation" and the second target option "300 joules" into one piece of medical operation content.

It should be noted that the first target option and the second target option inputted by the user can be the serial number of the option or the specific content of the option. In addition, the number and content of options in the operation recording guidance zone can be customized by users according to actual requirements.

In another application scenario, machine learning algorithm can also be used to perform semantic recognition on voice signals to determine the medical operation content. Specifically, a voice recognition process based on machine learning algorithm can include two stages, namely, a training stage and a recognition stage. In the training stage, a large number of voice corpus can be acquired, and feature vector parameters can be obtained after preprocessing and feature extraction. Finally, a reference model database of training voice can be established through feature modeling. In the recognition stage, the feature vector parameters of the inputted voice are compared with the reference model in the reference model database, and then the inputted feature vector with the highest similarity is taken as the recognized medical operation content. Of course, machine learning algorithm can also be self-learning algorithm or self-training reference model database.

The semantic recognition procedure of machine learning algorithm can also be as follows. After receiving the voice signal, semantic analysis of the voice signal is implemented to obtain a plurality of alternative items of medical operation content. In response to the selection operation performed by the user among the plurality of alternative items of medical operation content, the alternative items of medical operation content selected by the user are taken as the target content of the medical operation.

The semantic recognition process of machine learning algorithm can also be as follows. After receiving the voice signal, semantic analysis of the voice signal is implemented to extract a keyword that can represent the semantic content from the voice signal, and then the keyword is taken as the medical operation content. For example, the voice signal inputted by the medical staff is "implementing hear compression", and then the medical operation content obtained after the semantic analysis of the voice signal by machine learning algorithm is "compression".

The above has introduced several methods to explain how to determine the content and occurrence time of the medical operation according to the voice signal. Of course, the determination methods are not limited to the above, but can also include other implementation methods that can be expected by those skilled in the art.

In step S103, the operation information of the medical operation is recorded.

Wherein, the operation information of the medical operation can be stored locally in the medical device, or be sent to other devices such as the central station for storage. The operation information of the medical operation can be stored separately or together with other physiological data of the object to be operated.

It can be seen from the above technical scheme that the present disclosure has provided a medical operation recording method. When such method is applied to a medical device, this medical device can acquire a voice signal inputted by the user, obtain operation information of medical operation based on the voice signal, and store the operation information, wherein the operation information includes operation content and operation occurrence time. It can be seen that, the user can trigger the medical device to automatically record the operation information of the medical operation through the voice signal. Compared with the preset recording manner by the medical device through manual handwriting and scanning, this method can not only record timely and accurately, but also be applicable to some scenes that avoid direct contact with the devices, such as aseptic operation scenes, thus having a wider application range. In additional, this method can effectively reduce the trouble caused by the long distance between the recorder and the medical device. Even if the recorder is far away from the medical device, he/she still can quickly record the operation information of the medical operation in the medical device, which brings good user experience.

In practical application, on the basis of recording the operation information of medical operation, the recorded operation information can also be displayed for relevant personnel to view. One display scheme is to generate a medical procedure recording interface and display the operation information of the medical operation on the medical procedure recording interface.

Specifically, the medical procedure recording interface may be generated before the recording action of the operation information. For example, if the medical device detects the recording start instruction of the medical operation, the medical procedure recording interface is displayed. Alternatively, the medical procedure recording interface can also be generated after the recording action of the operation information. In addition, the operation information can be displayed in real time during the recording process, or triggered by the user in response to the display instruction according to the user's viewing demand.

The medical procedure recording interface includes an operation information display zone and/or an operation recording guidance zone. The operation recording guidance zone includes options corresponding to medical operation associated with the target medical procedure to guide the user to input the voice signal.

The operation information includes occurrence time. The format of the recorded occurrence time is more specific and includes more detailed time elements. For example, the format of the occurrence time includes year, month, day, hour, minute and second. However, in order to facilitate viewing, only some time elements of the occurrence time can be displayed, such as hour, minute and second. In this brief display mode, in order to view the information completely, the information of year, month, and day can also be displayed uniformly at a preset position in the operation information display zone.

If there are multiple items of recorded medical operation, the operation information of each item of medical operation can be displayed in the operation information display zone according to a sequence of their occurrence time. Among them, the operation information with the earlier occurrence time can be ranking in the front. Alternatively, the operation information with the later occurrence time can be ranking in the front.

Referring FIG. 2C, an example of a medical procedure recording interface has been shown. As shown in FIG. 2C, the interface includes an operation information display zone, in which ten pieces of operation information of medical operation are displayed. The ten pieces of operation information of medical operation are ranking in a reverse order according to the sequence of their occurrence time, that is, the operation information that occurs first is ranked at last.

It should be noted that after displaying the operation information of the medical operation, if the medical staff find that there are errors in the recorded operation information of the medical operation, or there are information items that need to be supplemented, they can also modify the operation information.

Specifically, in response to the user's modification instruction to the target medical operation, the operation information of the target medical operation can be modified according to the modification instruction.

Among them, the modification instruction can be inputted through voices, gestures, keys, touch screens and other forms. The modification instruction may include instruction information of the medical operation to indicate which medical operation should be modified by the medical device. For facilitating description, the medical operation indicated by the modification instruction can be referred to as the target medical operation. Specifically, the modification instruction can specify the target medical operation through the occurrence time. For example, the voice instruction can be "modify medical operation at 10:25:00". Alternatively, the modification instruction can indicate the target medical operation through the ranking position. For example, the voice instruction can be "modify fourth medical operation". Of course, it can also be other object indication methods that those skilled in the art can expect.

In response to the modification instruction, the medical device can set the operation information of the target medical operation to a state to be modified.

The object indicated to be modified by the modification instruction can be the medical operation content or the medical operation occurrence time. If the object to be modified is the occurrence time, the medical device can re-ranking the medical operation according to their occurrence time and display the operation information of the medical operation in the re-ranked order. In addition, when replacing the medical operation content, the replaced content can also be inputted according to instructions of the operation recording guidance zone.

It should be noted that the modification instruction can include a replacement instruction, addition instruction or deletion instruction. If the modification instruction includes a replacement instruction, the recorded information item would be replaced with the information item entered by the user. If the modification instruction includes an addition instruction, the information item inputted by the user can be added into the recorded operation information. If the modification instruction includes a deletion instruction, the information item indicated by the user in the recorded operation information can be deleted.

In order to facilitate subsequent viewing, the modification time can also be recorded, that is, the modification time can be recorded as an information item in the operation information of the medical operation.

In addition, the operation information recorded by the medical device can also be printed out or uploaded to other systems. Specifically, the operation information of the medical operation is transmitted to the printing device in response to the user's printing instruction for the operation information. The operation information of the medical operation is uploaded to a designated medical device in response to the user's uploading instruction for the operation information.

Among them, the printing instruction and uploading instruction can be inputted through voices, gestures, keys, touch screens and other forms, which will not be repeated here for concise objects.

The recording process of the medical operation is explained in detail by taking the cardiopulmonary resuscitation procedure for example.

Cardiopulmonary resuscitation procedure is often completed with the cooperation of three medical workers or trained personnel. Two of them are responsible for operation, such as cardiopulmonary resuscitation and drug administration and so on, in turns, while the other is responsible for recording the whole rescue process. Medical devices, such as monitor and defibrillator and so on, may be used during the rescue process. However, these medical devices often need to be close to the patient. Meanwhile, more space around the patient needs to be given to the personnel carrying out the rescue treatment.

If the medical staff needs to execute the cardiopulmonary resuscitation procedure for a patient, the recorder can first select the specific medical procedure of cardiopulmonary resuscitation on the medical device through various forms of instructions, such as keys, touch screens, voices, gestures, etc., after the starting of the cardiopulmonary resuscitation procedure. The recorder can also activate the operation recording function of the medical procedure by voices or gestures, such as a voice input of "rescue start".

Figure 3A:
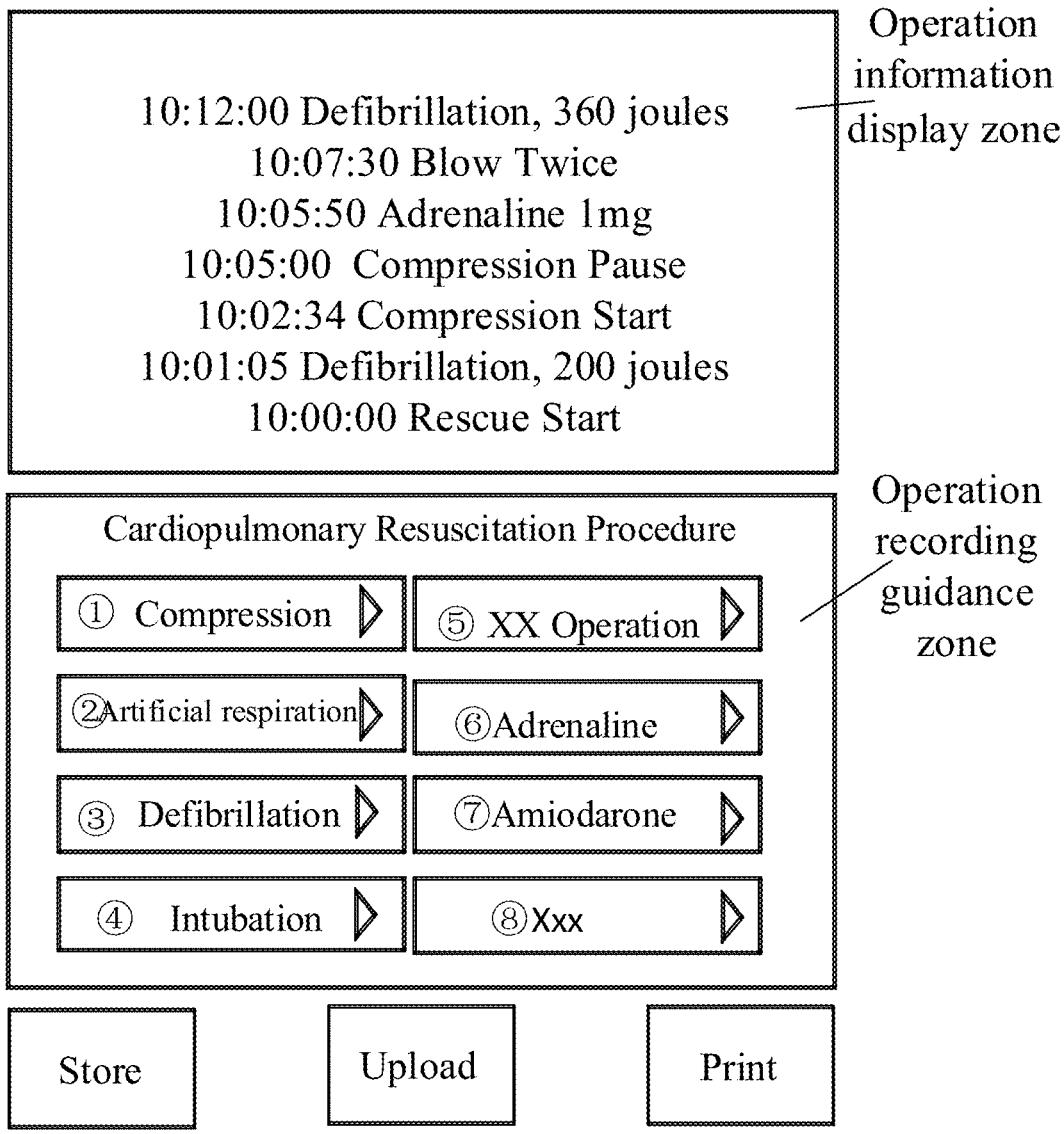
FIGS. 3A-3B are schematic diagrams showing a medical procedure recording interface.

After activating the operation recording function, the medical device can display a rescue procedure recording interface which can include but not limited to the operation information display zone and/or operation recording guidance zone. As shown in FIG. 3A, the upper part of the rescue procedure recording interface is the operation information display zone, while the lower part of the rescue procedure recording interface is the operation recording guidance zone. The operation recording guidance zone includes various operation options contained in the medical procedure of cardiopulmonary resuscitation procedure, in which the options can have serial number or not. In addition, the interface can also include buttons and icons for printing, saving and uploading.

The recorder can input a voice signal of "start rescue", and then the medical device will generate a medical operation content of "start rescue", and take the time point for receiving the voice signal as the medical operation occurrence time. At the same time, the operation information of the medical operation can be displayed in the operation information display zone, that is, "start rescue at 10:00:00".

When the operator implements a cardiopulmonary resuscitation rescue operation for the patient, the recorder can input content of the cardiopulmonary resuscitation rescue operation by a voice signal according to the guidance of the options. For example, the operator starts to compress the patient's heart, the recorder simultaneously inputs a voice signal of "start compression" or "1 start". After receiving the voice signal, the medical device determines the "start compression" as one piece of medical operation content based on the voice signal and takes the time point for receiving the voice signal as the medical operation occurrence time. The content and occurrence time of the medical operation are recorded as displayed in the operation information display zone.

Figure 3B:
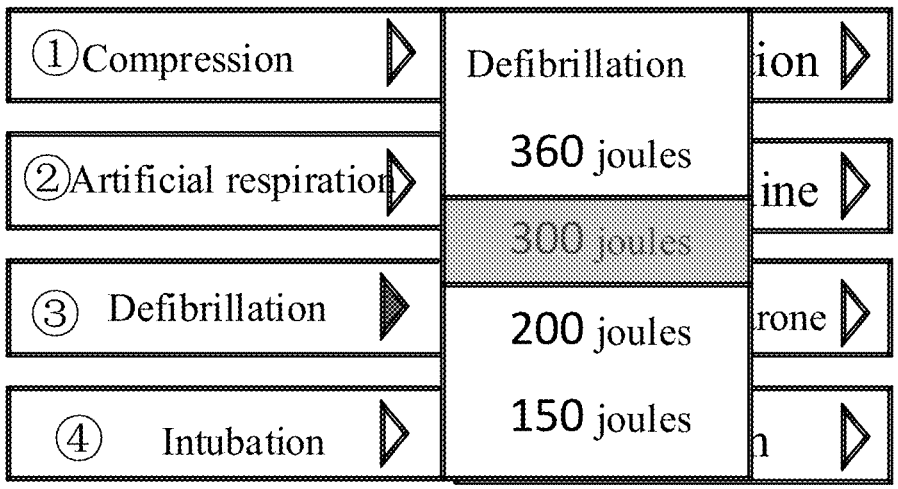

For another example, when the operator implements 200 joules of defibrillation for the patient, and the recorder simultaneously inputs a voice signal of "defibrillation" or "3". After receiving the voice signal, the medical device determines the option of "defibrillation" based on the voice signal, and then further determines that the option has associated options, such that the associated options would be displayed. As shown in FIG. 3B, the association options include 360 joules, 300 joules, 200 joules and 150 joules. The recorder further inputs a voice signal of "200 joules" or "2". After receiving the voice signal, the medical device determines the option of "200 joules" based on the voice signal. When determining that such sub-option is not further associated with a new sub-option, the two determined pieces of content are combined into one piece of medical operation content of "defibrillation, 200 joules". Take the receiving time point of the first or second voice signal as the occurrence time of the medical operation. The content and occurrence time of the medical operation are recorded as displayed in the operation information display zone.

According to the above method, the recorder records the medical operation performed by the operator on the medical device through voice signals. After the rescue is completed, the recorder can also input "rescue end" by a voice signal, and the medical device can also record the medical operation content and occurrence time. As shown in FIG. 2C. The medical device can also display the medical operation content and occurrence time in the operation information display zone.

If it is found that the operation information is recorded incorrectly, the medical staff can also modify it through voice instructions, such as changing the adrenaline dose from 1 mg to 2 mg.

After the medical procedure has been completed, the medical staff can also trigger the printing function by a voice or gesture signal to send the medical operation information of the medical procedure to the printing device for printing and outputting. In addition, the medical staff can also trigger a storage function by a voice or gesture signal to enable the medical device to store the medical operation information of the medical procedure as a file. In addition, the medical staff can also trigger an uploading function by a voice or gesture signal to upload the medical operation information of this medical procedure to a designated medical device.

It should be noted that the above various voice signal inputs can also be realized by gesture signal inputs. For example, the user uses a gesture to represent the serial number of the option, then the medical device performs an image recognition, determines which option is inputted according to the recognition content, and records the medical operation content represented by the option.

Figure 4:
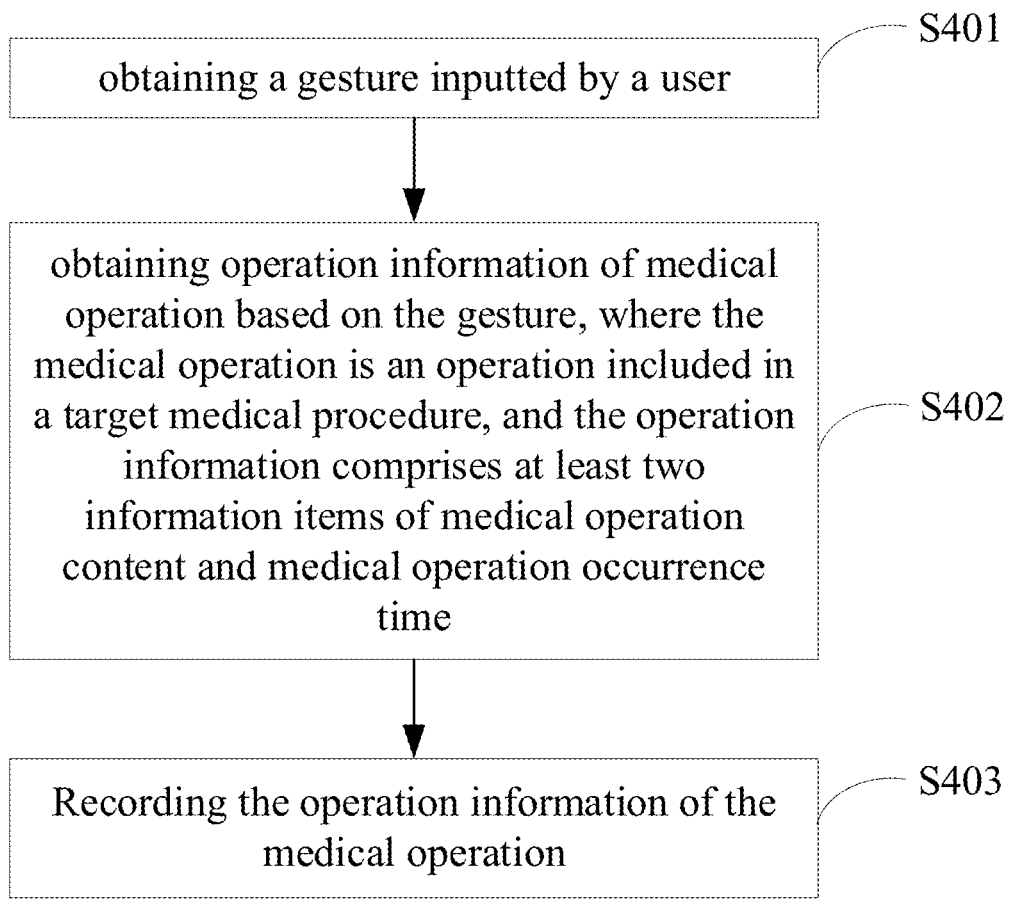
FIG. 4 is another flowchart of a medical operation recording method.

In addition, this disclosure has further provided a medical operation recording method applicable to a medical device. Different from the above medical operation recording methods, this method records medical operation based on gestures rather than voice signals. Specifically, as shown in FIG. 4, this method may include the following steps S401 to S403.

In step S401, a gesture inputted by a user is obtained.

In step S402, operation information of medical operation based on the gesture is obtained. Wherein, the medical operation is operation included in a target medical procedure, and the operation information includes at least two information items of medical operation content and medical operation occurrence time.

In step S403, the operation information of the medical operation is recorded.

The specific implementation method for obtaining operation information of medical operation based on the gesture, includes: determining medical operation content according to the gesture; determining a time point for receiving the gesture as the medical operation occurrence time or obtaining the medical operation occurrence time from an execution device of the medical operation.

The specific implementation method for determining medical operation content according to the gesture, includes determining the medical operation content corresponding to the gesture inputted by the user according to a preset corresponding relationship between the gesture and the medical operation content.

In the specific implementation, the corresponding relationship between the gesture and the medical operation content can be predefined. For example, an action of clapping downward for three times is predefined to correspond to medical operation content of compression. For further example, an action of circling by hand is predefined to correspond to medical operation content of injection, and so on. In a practical application, after detecting a certain type of gesture, the medical device can determine the medical operation content corresponding to the gesture.

The specific implementation method for determining medical operation content according to the gesture, includes displaying an operation recording guidance zone which includes options corresponding to medical operation associated with the target medical procedure; determining a target option corresponding to the gesture, and determining the medical operation corresponding to the target option as the medical operation content.

In one example, the above method may also include generating a medical procedure recording interface and displaying the operation information of the medical operation on the medical procedure recording interface.

In one example, the method may further include displaying a medical procedure recording interface if the medical device detects a recording start instruction of a medical operation. Wherein the medical procedure recording interface includes an operation information display zone and/or an operation recording guidance zone. The operation recording guidance zone includes options corresponding to a medical operation associated with the target medical procedure.

In one example, the above method can also include that displaying operation information of medical operation in the operation information display zone according to a sequence of their occurrence time, if the operation information display zone is included by the medical procedure recording interface.

In the present disclosure, a medical device is provided, which includes a display, a memory and a processor. Wherein the display is configured to display information. The memory is configured to store executable program instructions. The processor is configured to execute the executable program instructions to implement steps of each medical operation recording method.

Figure 5:
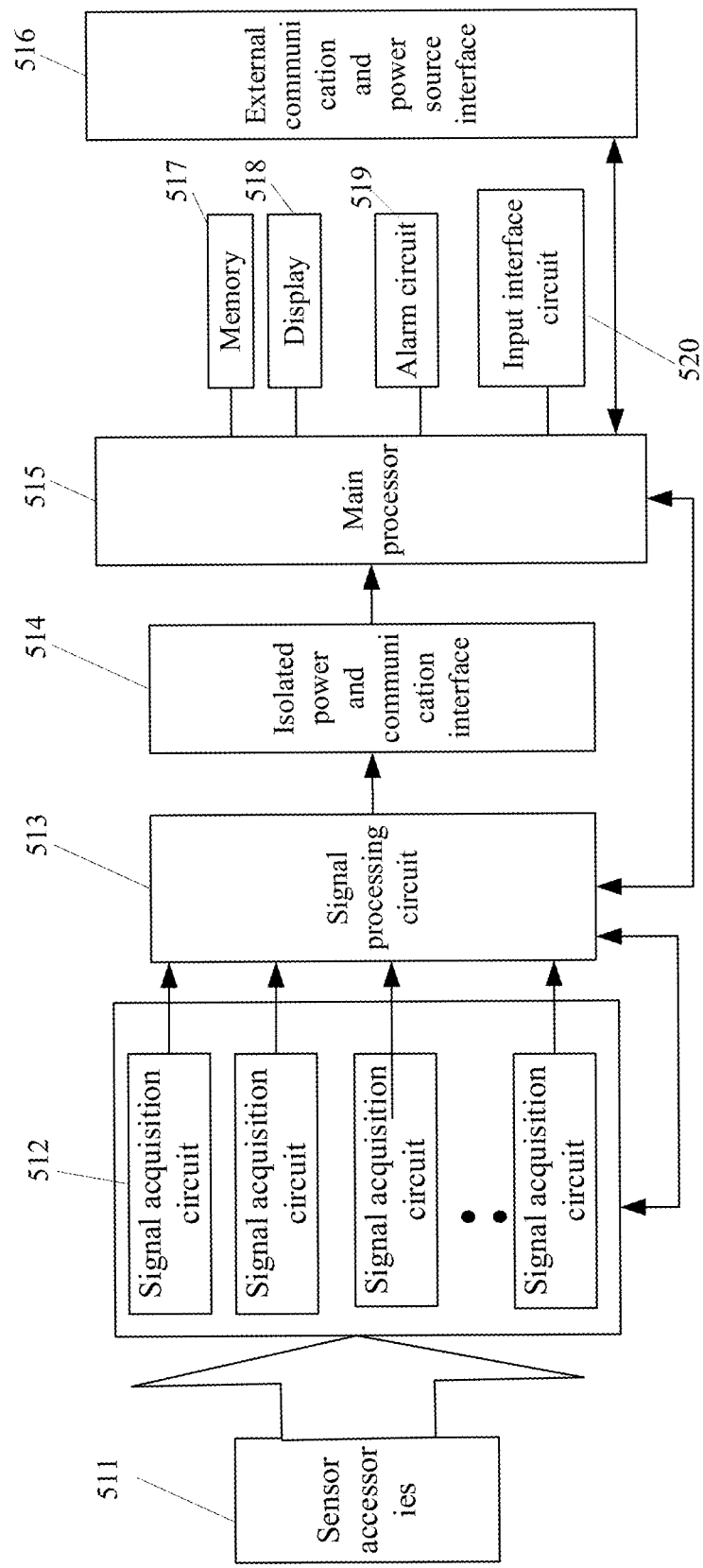
FIG. 5 is a structural diagram of a monitoring device.

The medical device can be specifically a monitor, and a specific example of which is shown in FIG. 5. FIG. 5 provides a system framework diagram of a parameter processing module in a multi-parameter monitor.

The multi-parameter monitor has an independent housing, whose panel is provided with a sensor interface zone which is integrated therein multiple sensor interfaces for connecting with various external physiological parameter sensor accessories 511. The housing panel also includes a small lxD display zone, a display 518, an input interface circuit 920 and an alarm circuit 519 (such as, a LED alarm zone). A parameter processing module is used as an external communication and power source interface for communicating with a main unit and taking power from the main unit. The parameter processing module also supports a build-out parameter module, can form a plug-in monitor main unit by means of inserting the parameter module, can be used as part of the monitor, or can be connected to the main unit via a cable, with the build-out parameter module being used as an external accessory of the monitor. In addition, the multi-parameter monitor includes a memory 517 for storing computer programs and various data generated during the related monitoring process.

The internal circuit of the parameter processing module is disposed inside the housing. As shown in FIG. 5, the internal circuit includes a signal acquisition circuit 512 corresponding to at least two physiological parameters, a front-end signal processing circuit 513 and a main processor 515.

The main processor 515 can implement each step associated with each medical operation recording method described above.

The signal acquisition circuit 512 may be selected from an electrocardiogram circuit, a respiration circuit, a body temperature circuit, a blood oxygen saturation circuit, a non-invasive blood pressure circuit, an invasive blood pressure circuit, etc. These signal acquisition circuits 512 are electrically connected with corresponding sensor interfaces for electrically connecting to sensor accessories 511 corresponding to different physiological parameters. An output terminal of the signal acquisition circuit 512 is coupled to the front-end signal processing circuit 513 whose communication terminal is further coupled to the main processor 15. The main processor 15 is electrically connected with the external communication and power interface 516.

Various general circuits and modules known in the prior art can be used to realize the signal acquisition circuit 512 for various physiological parameters. The front-end signal processing circuit 513 can be configured to complete the sampling and analog-to-digital conversion of output signals of the signal acquisition circuit 512, and output control signals to control the physiological parameter measurement process. The physiological parameters include but are not limited to parameters of electrocardiogram, respiration, body temperature, blood oxygen saturation, non-invasive blood pressure, and invasive blood pressure.

The front-end signal processing circuit 513 can be realized by a single-chip microcomputer or other semiconductor devices, or ASIC or FPGA. The front-end signal processing circuit 513 can be powered by an isolated power supply. After a simple processing and packaging, the sampled data can be sent to the main processor through an isolated communication interface. For example, the front-end signal processing circuit 513 can be coupled to the main processor 515 through the isolated power and communication interface 514.

Supplying electrical power to the front-end signal processing circuit through the isolated power supply has a function of isolating the patient from the power supply equipment through isolating the DC/DC power supply via a transformer. In such a way, the application part is floating through the isolation transformer, such that the leakage current passing through the patient is small enough, and bad influences on boards and devices of intermediate circuits, such as main control board (guaranteed by creepage distance and electrical clearance), due to voltage or energy generated during a defibrillation or electric knife application, can be prevented.

The main processor completes the calculation of physiological parameters and sends calculation results and waveforms of the physiological parameter to the main unit (such as, a main unit with a display, PC, a central station, etc.) through the external communication and power interface. The external communication and power source interface 516 may be one or a combination of local area network interfaces composed of Ethernet, Token Ring, Token Bus, and optical fiber distributed data interface (FDDI) as the backbone of these three networks, may also be one or a combination of wireless interfaces such as infrared, Bluetooth, WIFI, and WMTS communication, or may also be one or a combination of wired data connection interfaces such as RS232 and USB.

The external communication and power source interface 516 may also be one or a combination of the wireless data transmission interface and the wired data transmission interface. The main unit may be any computer device such as a main unit of the monitor, an electrocardiograph, an ultrasonic diagnosis instrument, a computer, etc. A monitor can be formed by means of installing with matching software. The main unit may also be a communication device, such as a mobile phone, and the parameter processing module sends data to a mobile phone that supports Bluetooth communication via a Bluetooth interface to realize remote data transmission.

In additional, this disclosure has provided a readable storage medium on which a computer program is stored, wherein when the computer program is executed by a processor, steps of the medical operation recording method are implemented.

It should be noted that each embodiment in this disclosure is described in a progressive manner Each embodiment focuses on the differences from the other embodiments. The same and similar parts of each embodiment can be referred to each other.

It should also be noted that in this disclosure, relational terms such as first and second are only used to distinguish one entity or operation from another entity or operation, and do not necessarily require or imply any such actual relationship or order between these entities or operation.

In addition, the terms "comprising", "having", and any variations thereof are intended to cover non-exclusive inclusion. For example, a process, a method, a system, a product, or a device that includes a series of steps or units is not limited to the listed steps or units, but optionally further includes unlisted steps or units, or optionally further includes other steps or units inherent in these procedures, methods, or devices. Without further restrictions, the elements defined by the statement "comprising a . . . " do not exclude the existence of other same elements in the process, method, article or device including the above elements.

The above description of the disclosed embodiments enables those skilled in the art to realize or use this disclosure. Various modifications to these embodiments will be apparent to those skilled in the art, and the general principles defined herein can be implemented in other embodiments without departing from the spirit or scope of this disclosure. Therefore, this disclosure will not be limited to these embodiments shown herein, but will conform to the widest scope consistent with the principles and novel features disclosed herein.

What is claimed is:

1. A medical operation recording method performed by a medical device, comprising:

acquiring, by an audio acquisition module of the medical device, a voice signal describing a medical operation, wherein the voice signal is inputted by a user when an operation action is being or has been performed on a patient;

determining operation information of the medical operation, by the medical device, based on the voice signal, wherein the medical operation is representative of said operation action that is being or has been performed on the patient for a target medical procedure which comprises a series of operation actions, including said operation action, in a target medical treatment scenario, and the operation information comprises medical operation content describing the medical operation and medical operation occurrence time of the medical operation; and recording the operation information of the medical operation by the medical device, wherein determining operation information of the medical operation based on the voice signal comprises:

determining the target medical procedure, from a plurality of medical procedures provided by the medical device, based on a procedure selecting instruction;

displaying an operation recording guidance zone which comprises a plurality of options, the plurality of options representing a plurality of medical operations associated with the target medical procedure, the plurality of medical operations including the medical operation for which said operation action is being or has been performed on the patient, wherein the plurality of options are used to visually guide the user to input the voice signal by providing a numerical order preceding each of the options;

determining a first target option inputted by the user from the voice signal;

displaying associated sub-options of the first target option in response to determining the first target option;

determining a second target option selected by the user among the associated sub-options;

combining respective medical operations corresponding to the first target option and the second target option to obtain a combined medical operation; and determining the combined medical operation as the medical operation to be recorded by the medical device;

wherein the target medical treatment scenario is a cardiopulmonary resuscitation procedure, and the operation recording guidance zone comprises four options, in which different options correspond to different medical operations included in the cardiopulmonary resuscitation procedure; the four options comprise an option of compression, an option of blow, an option of defibrillation and an option of intubation; the option of defibrillation is associated with multiple sub-options of defibrillation power.

2. The medical operation recording method according to claim 1, further comprising:

starting the audio acquisition module for acquiring the voice signal inputted by the user, if a recording start instruction of the medical operation is detected by the medical device.

3. The medical operation recording method according to claim 2, wherein a recording start instruction of the medical operation is detected by the medical device comprises any one of:

determining that the recording start instruction is detected, if a light change that satisfies a preset requirement is detected by a photosensitive module;

determining that the recording start instruction is detected, if a gesture that satisfies a preset requirement is detected in an image acquired by an image acquisition module; or determining that the recording start instruction is detected, if a triggering instruction is received by a recording start key.

4. The medical operation recording method according to claim 1, wherein determining operation information of the medical operation based on the voice signal further comprises:

determining a time point for receiving the voice signal as the medical operation occurrence time or obtaining the medical operation occurrence time from an execution device of the medical operation.

5. The medical operation recording method according to claim 1, wherein determining operation information of the medical operation based on the voice signal further comprises:

implementing a semantic recognition on the voice signal by using a machine learning algorithm to determine the medical operation content.

6. The medical operation recording method according to claim 1, wherein determining operation information of the medical operation based on the voice signal further comprises:

obtaining a preset keyword database comprising at least one medical operation keyword; and extracting content corresponding to the medical operation keyword from the voice signal as the medical operation content.

7. The medical operation recording method according to claim 1, wherein determining operation information of the medical operation based on the voice signal further comprises:

obtaining a keyword database corresponding to the target medical procedure, wherein the keyword database comprises at least one medical operation keyword associated with the target medical procedure; and extracting content corresponding to the medical operation keyword from the voice signal as the medical operation content.

8. The medical operation recording method according to claim 1, further comprising:

generating a medical procedure recording interface; and displaying the operation information of the medical operation on the medical procedure recording interface.

9. The medical operation recording method according to claim 1, further comprising:

displaying a medical procedure recording interface that includes an operation information display zone and the operation recording guidance zone, if a recording start instruction of the medical operation is detected by the medical device and displaying the operation information of the medical operation in the operation information display zone according to a sequence of occurrence time of the medical operation, if the medical procedure recording interface includes the operation information display zone.

10. The medical operation recording method according to claim 1, further comprising:

displaying, by a display module of the medical device, the operation information of the medical operation in real time during the recording of the operation information of the medical operation by the medical device or in response to a display instruction according to the user's viewing demand.

11. The medical operation recording method according to claim 1, wherein the operation recording guidance zone further comprises one or more options of drug name, and the one or more options of drug name is associated with multiple sub-options of drug dosage.

12. The medical operation recording method according to claim 1, wherein determining operation information of the medical operation based on the voice signal further comprises: detecting preset mark information in the voice signal, wherein the preset mark information is before or after the medical operation content in the voice signal, and voice content associated with the preset mark information is used for determining the medical operation content by indicating a start position or an end position of the medical operation content in the voice signal;

when the preset mark information is before the medical operation content, the voice content after the preset mark information is determined as the medical operation content; when the preset mark information is after the medical operation content, the voice content before the preset mark information is determined as the medical operation content.

13. A medical operation recording method performed by a medical device, comprising:

acquiring a gesture by an image acquisition module of the medical device, wherein the gesture is inputted by a user of the medical device while an operation action is being or has been performed on a patient;

determining operation information of the medical operation, by the medical device, based on the gesture, wherein the medical operation is representative of said operation action that is being or has been performed on the patient for a target medical procedure which comprises a series of operation actions, including said operation action, in a target medical treatment scenario, and the operation information comprises medical operation content describing the medical operation and medical operation occurrence time of the medical operation; and recording the operation information of the medical operation by the medical device, wherein determining the operation information of the medical operation based on the gesture comprises:

displaying an operation recording guidance zone which comprises a plurality of options, the plurality of options representing a plurality of medical operations associated with the target medical procedure, the plurality of medical operations including the medical operation for which said operation action is being or has been performed on the patient, wherein the plurality of options are used to guide the user to input the gesture; and determining a target option corresponding to the gesture, and determining the medical operation corresponding to the target option as the medical operation content recorded by the medical device;

wherein the target medical treatment scenario is a cardiopulmonary resuscitation procedure, and the operation recording guidance zone comprises four options, in which different options correspond to different medical operations included in the cardiopulmonary resuscitation procedure; the four options comprise an option of compression, an option of blow, an option of defibrillation and an option of intubation.

14. The medical operation recording method according to claim 13, wherein determining operation information of the medical operation based on the gesture further comprises:

determining a time point for receiving the gesture as the medical operation occurrence time or obtaining the medical operation occurrence time from an execution device of the medical operation.

15. The medical operation recording method according to claim 13, wherein determining operation information of the medical operation based on the gesture further comprises:

determining the medical operation content corresponding to the gesture inputted by the user according to a preset corresponding relationship between the gesture and the medical operation content.

16. The medical operation recording method according to claim 13, further comprising:

generating a medical procedure recording interface; and displaying the operation information of the medical operation on the medical procedure recording interface.

17. The medical operation recording method according to claim 13, further comprising:

displaying a medical procedure recording interface includes an operation information display zone and the operation recording guidance zone, if a recording start instruction of the medical operation is detected by the medical device; and displaying the operation information of the medical operation in the operation information display zone according to a sequence of occurrence time of the medical operation, if the operation information display zone is included by the medical procedure recording interface.

18. A medical device, comprising:

a display configured to display information;

a memory configured to store executable program instructions;

a signal acquisition module; and a processor configured to execute the executable program instructions to implement a medical operation recording method, comprising:

acquiring, by the signal acquisition module, an input signal inputted by a user of the medical device while an operation action is being performed or has been performed on a patient, wherein the input signal comprises a voice signal or a gesture;

determining operation information of the medical operation, by the medical device, based on the input signal, wherein the medical operation is representative of said operation action that is being or has been performed on the patient for a target medical procedure which comprises a series of operation actions, including said operation action, in a target medical treatment scenario, and the operation information comprises medical operation content describing the medical operation and medical operation occurrence time of the medical operation; and recording the operation information of the medical operation by the medical device, wherein under a condition that the input signal comprises a voice signal, determining operation information of the medical operation based on the input signal comprises:

determining the target medical procedure, from a plurality of medical procedures provided by the medical device, based on a procedure selecting instruction;

displaying an operation recording guidance zone which comprises a plurality of options, the plurality of options representing a plurality of medical operations associated with the target medical procedure, the plurality of medical operations including the medical operation for which said operation action is being or has been performed on the patient, wherein the plurality of options are used to visually guide the user to input the voice signal by providing a numerical order preceding each of the options;

determining a first target option inputted by the user from the voice signal;

displaying associated sub-options of the first target option in response to determining the first target option;

determining a second target option selected by the user among the associated sub-options;

combining respective medical operations corresponding to the first target option and the second target option; and determining the combined medical operation as the medical operation to be recorded by the medical device;

wherein the target medical treatment scenario is a cardiopulmonary resuscitation procedure, and the operation recording guidance zone comprises four options, in which different options correspond to different medical operations included in the cardiopulmonary resuscitation procedure; the four options comprise an option of compression, an option of blow, an option of defibrillation and an option of intubation; the option of defibrillation is associated with multiple sub-options of defibrillation power.

19. The medical device according to claim 18, wherein the medical operation recording method further comprises:
  determining a time point for receiving the input signal as the medical operation occurrence time or obtaining the medical operation occurrence time from an execution device of the medical operation.

20. The medical device according to claim 19, wherein when the input signal comprises the voice signal, and the medical operation recording method further comprises:
  obtaining a preset keyword database comprising at least one medical operation keyword, and extracting content corresponding to the medical operation keyword from the voice signal as the medical operation content;
  determining the target medical procedure based on an input instruction of the user, obtaining a keyword database corresponding to the target medical procedure, wherein the keyword database comprises at least one medical operation keyword associated with the target medical procedure; and extracting content corresponding to the medical operation keyword from the voice signal as the medical operation content.

* * * * *